United States Patent
Broderick et al.

(10) Patent No.: US 9,321,004 B2
(45) Date of Patent: Apr. 26, 2016

(54) MIXTURES OF PHYSICAL ABSORPTION SOLVENTS AND IONIC LIQUIDS FOR GAS SEPARATION

(71) Applicant: UOP LLC, Des Plaines, IL (US)

(72) Inventors: Erin M. Broderick, Evanston, IL (US); Alakananda Bhattacharyya, Glen Ellyn, IL (US)

(73) Assignee: UOP LLC, Des Plaines, IL (US)

( * ) Notice: Subject to any disclaimer, the term of this patent is extended or adjusted under 35 U.S.C. 154(b) by 86 days.

(21) Appl. No.: 13/873,804

(22) Filed: Apr. 30, 2013

(65) Prior Publication Data

US 2014/0319419 A1 Oct. 30, 2014

(51) Int. Cl.
*B01D 53/14* (2006.01)

(52) U.S. Cl.
CPC ........ *B01D 53/1493* (2013.01); *B01D 53/1475* (2013.01); *B01D 2252/30* (2013.01); *B01D 2252/504* (2013.01); *Y02C 10/06* (2013.01)

(58) Field of Classification Search
CPC .................................................. B01D 53/1493
USPC ........................................................ 252/190
See application file for complete search history.

(56) References Cited

U.S. PATENT DOCUMENTS

| | | |
|---|---|---|
| 2005/0169825 A1 | 8/2005 | Cadours et al. |
| 2009/0084509 A1* | 4/2009 | Luo et al. ............ 162/9 |
| 2011/0014100 A1 | 1/2011 | Bara et al. |
| 2011/0214566 A1 | 9/2011 | Lee et al. |
| 2012/0063980 A1 | 3/2012 | Kortunov et al. |
| 2012/0088292 A1 | 4/2012 | Fradette et al. |
| 2012/0308458 A1 | 12/2012 | Seiler et al. |
| 2012/0325089 A1 | 12/2012 | Udatsu et al. |
| 2013/0078170 A1 | 3/2013 | Dai et al. |

FOREIGN PATENT DOCUMENTS

| | | | |
|---|---|---|---|
| CN | 102174754 A | * | 9/2011 |
| JP | 2008296211 A | | 12/2008 |
| JP | 2010248052 A | | 11/2010 |
| JP | 2013017993 A | | 1/2013 |
| WO | 2011147033 A2 | | 12/2011 |
| WO | 2012158609 A1 | | 11/2012 |
| WO | 2012171831 A1 | | 12/2012 |

OTHER PUBLICATIONS

Chang et al., English abstract of CN 102174754.*
Bara, "Gas Processing with Ionic Liquid-Amine Solvents", Annual Convention Proceedings—Gas Processors Association (2010), 89th, a13/1-a13/9.
Camper, "Room-Temperature Ionic Liquid—Amine Solutions: Tunable Solvents for Efficient and Reversible Capture of CO2", Ind. Eng. Chem. Res. 2008, 47, 8496-8498.
Harper, "Survey of Carbon Dioxide Capture in Phosphonium-Based Ionic Liquids and End-Capped Polyethylene Glycol Using DETA (DETA=Diethylenetriamine) as a Model Absorbent", Ind. Eng. Chem. Res. 2011, 50, 2822-2830.
Hasib-Ur-Rahman, "Corrosion Behavior of Carbon Steel in Alkanolamine/ Room-Temperature Ionic Liquid Based CO2 Capture Systems", Ind. Eng. Chem. Res. 2012, 51, 8711-8718.
Li, "Absorption of CO2 by ionic liquid polyethylene glycol mixture and the thermodynamic parameters", Green Chem., 2008, 10, 879-884.
U.S. Appl. No. 13/873,823, filed Apr. 30, 2013.
Ahmady, "Kinetics of Carbon Dioxide absorption into aqueous MEDA + [bmim][BF4] solutions from 303 to 333 K", Chemical Engineering Journal 200-202 (2012) 317-328.
Search Report dated Aug. 25, 2014 for corresponding PCT Appl. No. PCT/US2014/032903.

* cited by examiner

*Primary Examiner* — Peter F Godenschwager

(57) ABSTRACT

The invention comprises an absorbent composition and process for purification of gaseous mixtures. The composition comprises a mixture of a physical absorption solvent and an ionic liquid. It was found that the mixtures provided improved absorption of a gas component, such as carbon dioxide, when compared physical absorption solvents.

7 Claims, 1 Drawing Sheet

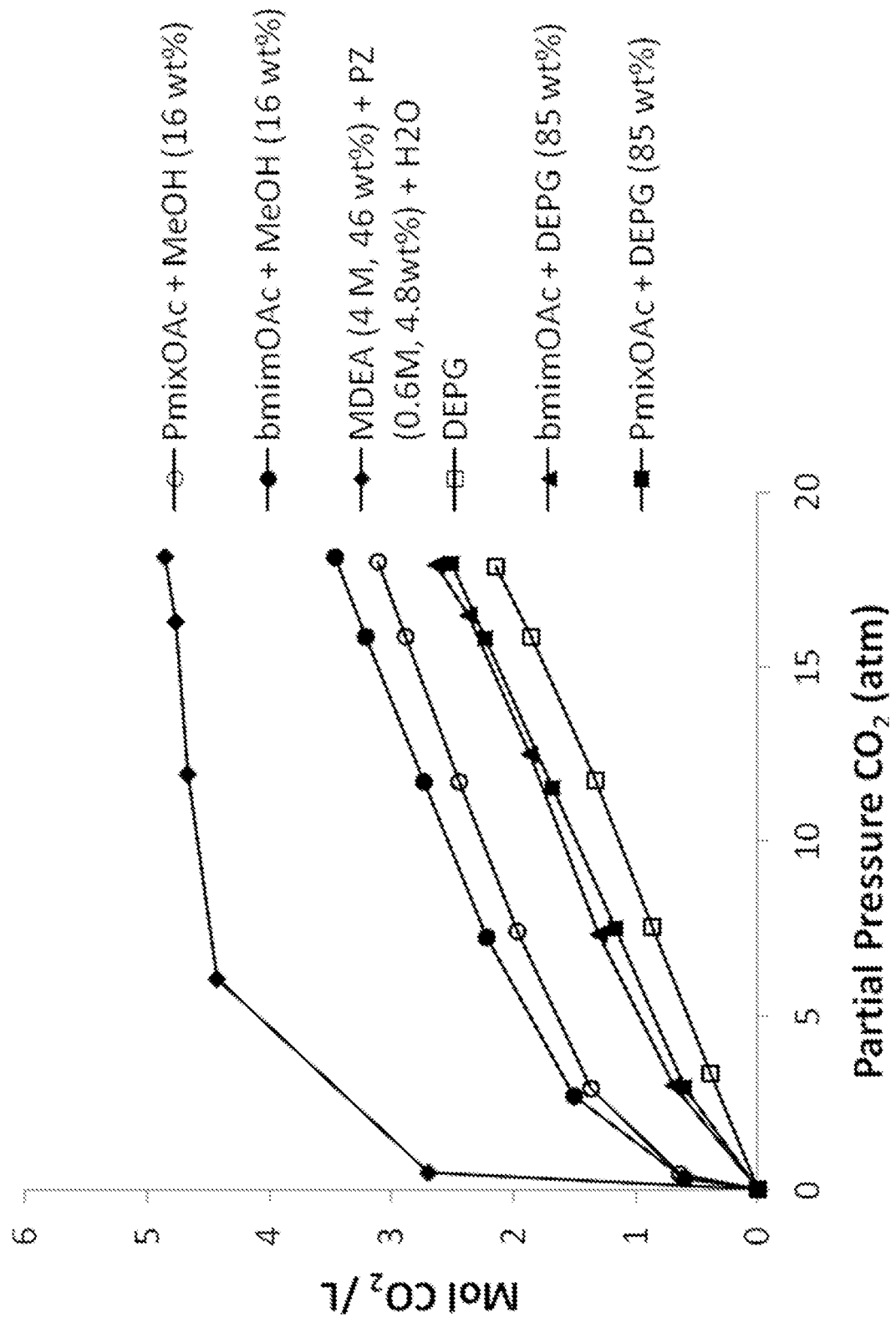

MIXTURES OF PHYSICAL ABSORPTION SOLVENTS AND IONIC LIQUIDS FOR GAS SEPARATION

BACKGROUND OF THE INVENTION

The separation of carbon dioxide from gas mixtures, such as natural gas, flue gas, syngas and shale gas, is of industrial importance. The removal of carbon dioxide is necessary to improve the fuel quality of the natural gas or to use syngas. In addition, the combination of carbon dioxide and water can be corrosive to metal pipes, which makes the removal of $CO_2$ necessary for transportation of natural gas. Also, carbon dioxide is a greenhouse gas that needs to be captured from flue gases to avoid harming the environment.

Current removal technologies, such as physical absorption solvents methanol, N-methylpyrrolidone, dimethyl ether of polyethylene glycol, and propylene carbonate, have many drawbacks. Common issues with these solvent removal systems are low operating temperatures and high operating pressures. In addition, effluent washes may be needed for solvents lost in the stream. Physical absorption solvents tend to be favored over chemical solvents when the concentration of acid gases or other impurities is very high. Unlike chemical solvents, physical absorption solvents are non-corrosive, requiring only carbon steel construction.

In recent years, it has been found that some ionic liquids are useful in the capture of carbon dioxide. For example, in WO 201217183, a process was disclosed for separating carbon dioxide from a gaseous stream through chemisorption by 1-ethyl-3-methylimidazolium (emim) or 1-propyl-3-methylimidazolium (pmim) containing ionic liquids with a carboxylate salt and the presence of guanidinium acetate or 1-butyl-3-methylimidazolium (bmim) acetate.

In addition, prior art has described the use of amine solutions combined with ionic liquids for removal of carbon dioxide and other impurities (US 2012/0063978 A1).

There are approximately four types of physical absorption solvents that are used for the purification of gas mixtures. These include dimethyl ether of polyethylene (DEPG), methanol, N-methyl-pyrrolidone (NMP) and propylene carbonate (PC).

Dimethyl ether of polyethylene glycol (DEPG) is a mixture of dimethyl ethers of polyethylene glycol ($CH_3O(C_2H_4O)_nCH_3$ where n is between 2 and 9) used to physically absorb $H_2S$, $CO_2$, and mercaptans from gas streams. Solvents containing DEPG are licensed, manufactured, or used in processes by several companies including Coastal Chemical Company (as Coastal AGR), Dow (Selexol), and UOP (Selexol process). Other process suppliers such as Clariant GmbH of Germany offer similar solvents. Clariant solvents are a family of dialkyl ethers of polyethylene glycol under the Genosorb® name. DEPG can be used for selective $H_2S$ removal which requires stripping, vacuum stripping, or a reboiler. The process can be configured to yield both a rich $H_2S$ feed to the Claus unit as well as bulk $CO_2$ removal. Selective $H_2S$ removal with deep $CO_2$ removal usually requires a two-stage process with two absorption and regeneration columns. $H_2S$ is selectively removed in the first column by a lean solvent that has been thoroughly stripped with steam, while $CO_2$ is removed in the second absorber. The second stage solvent can be regenerated with air or nitrogen for deep $CO_2$ removal, or using a series of flashes if bulk $CO_2$ removal is required. DEPG also dehydrates the gas and removes HCN. Compared to the other solvents, DEPG has a higher viscosity which reduces mass transfer rates and tray efficiencies and increases packing or tray requirements, especially at reduced temperatures.

There are a number of methanol processes for acid gas removal including the Rectisol process (licensed by Lurgi AG) and Ifpexol® (Prosernat). The Rectisol process was the earliest commercial process based on an organic physical absorption solvent and is widely used for synthesis gas applications. The process operates at a very low temperature and is complex compared to other physical absorption solvent processes. The main application for the Rectisol process is purification of synthesis gases derived from the gasification of heavy oil and coal rather than natural gas treating applications. The two-stage Ifpexol process can be used for natural gas applications. Ifpex-1 removes condensable hydrocarbons and water, and Ifpex-2 removes acid gas. Methanol has a relatively high vapor pressure at normal process conditions, so deep refrigeration or special recovery methods are required to prevent high solvent losses. Water washing of 3 effluent streams is often used to recover the methanol. The Rectisol process typically operates below 32° F. (0° C.) and may be operated at temperatures as low as −95° F. (−70.5° C.). The process usually operates between −40° F. and −80° F. (−40° C. and −62° C.).

Solubilities of $H_2S$ and COS in methanol are higher than in DEPG. Rectisol's complex flow scheme and the need to refrigerate the solvent can be disadvantages with respect to higher capital and operating costs. The supply of refrigeration at low temperatures requires much power. However, this disadvantage can be outweighed by a considerable reduction of the solvent flow rate for $CO_2$ removal as compared to other physical absorption solvent processes. Acid gas solubility in physical absorption solvents increases significantly as the temperature decreases. Low temperature also reduces solvent losses by lowering the vapor pressure of the methanol in the product streams. If $H_2S$ is to be removed from a gas with $CO_2$ remaining in the treated gas, DEPG and NMP are more suitable than methanol.

The Purisol Process which uses NMP (N-methyl-2-pyrrolidone) is licensed by Lurgi AG. The flow schemes used for this solvent are similar to those used for DEPG. The process can be operated either at ambient temperature or with refrigeration down to about 5° F. (−15° C.). NMP has a relatively high vapor pressure compared to DEPG or PC, and the licensor recommends water washing of both the treated gas and the rejected acid gases for solvent recovery. Obviously, NMP cannot be used for simultaneous gas dehydration if a water wash is used. In general, NMP recovery with water is not necessary if the Purisol process is operated at subambient temperatures. NMP has been reported to have the highest selectivity of all the physical absorption solvents considered here for $H_2S$ over $CO_2$. COS is not as soluble as $H_2S$, but it is hydrolyzed by the NMP solvent. The Purisol process is particularly well suited to the purification of high-pressure, high $CO_2$ synthesis gas for gas turbine integrated gasification combined cycle (IGCC) systems because of the high selectivity for $H_2S$.

The Fluor Solvent process which uses propylene carbonate (PC) is licensed by Fluor Daniel, Inc. and has been in use since the late 1950's. PC is available as JEFFSOL® PC solvent and is particularly advantageous in treating syngas. PC has an advantage over the other solvents when little or no $H_2S$ is present and $CO_2$ removal is important. PC has lower solubilities of the gas being purified: light hydrocarbons in natural gas and hydrogen in synthesis gas. This lower solubility results in lower recycle gas compression requirements for the gas flashed from the rich solvent at intermediate pressures, and lower hydrocarbon losses in the $CO_2$ vent gas stream.

Ionic liquids are capable of solubilizing or reacting with polar molecules. Ionic liquids are comprised of a cation and anion and are liquid at or below the process temperature. Ionic liquids characteristically are non-flammable, non-degradable, viscous, thermally stable and have a low vapor pressure. Many of these characteristics would be solutions to the problems of current carbon dioxide removal technology. While many of the characteristics of ionic liquids are beneficial, the high viscosity of ionic liquids may be challenging. It has now been found that ionic liquids can be added to physical absorption solvents in a variety of weight percents to alleviate the viscosity issue, and improve the performance of the solvent.

BRIEF DESCRIPTION OF THE DRAWING

The FIGURE shows the isotherms using a physical absorption solvent as a control and mixtures of physical absorption solvents with ionic liquids.

DESCRIPTION OF THE INVENTION

One embodiment of the invention involves a composition comprising an ionic liquid and a physical absorption solvent. The physical absorption solvents that may be used include, but are not limited to, dimethyl ethers of propylene glycol, N-methyl-2-pyrrolidone, methanol, propylene carbonate, poly(propylene glycol) di-methyl ether (PPGDME), poly(propylene glycol) di-acetate (PPGDAc), poly(butylene glycol) di-acetate (PBGDAc) with linear or branched C4 monomers, poly(dimethyl siloxane) (PDMS), perfluoropolyether (PFPE), glycerol tri-acetate (GTA), acetone, methyl acetate, 1,4-dioxane, 2-methoxyethyl acetate, 2-nitropropane, n,n-dimethylacetamide, acetylacetone, 1-nitropropane, isooctane, 2-(2-butoxyethoxy)ethyl acetate, n-formylmorpholine, 2-butoxyethyl acetate, and n-tert-butylformamide. Preferably, the physical absorption solvent is a dimethyl ether of propylene glycol, N-methyl-2-pyrrolidone, methanol and propylene carbonate. The cation of the ionic liquids may be selected from, but is not limited to, the following: ammonium, phosphonium, imidazolium, pyrazolium, pyridinium, pyrrolidinium, sulfonium, piperidinium, caprolactamium, guanidinium and morpholium. The anion of the ionic liquid may be selected from, but is not limited to, the following: halides, carboxylates, sulfonates, sulfates, tosylates, carbonates, phosphates, phosphinates, borates, cyanates, bis(trifluoromethylsulfonyl)imides, and aprotic heterocyclic anions. The ionic liquid is preferably selected from the group consisting of phosphonium and imidazolium acetate ionic liquids. The composition may further comprise water.

The composition may comprise about 1-99 vol % ionic liquid and about 1-99 vol % absorption solvent. It may comprise about 5-95 vol % ionic liquid and about 5-95 vol % physical absorption solvent. In other embodiments, the composition comprises about 25-75 vol % of the ionic liquid and about 25-75 vol % of the physical absorption solvent. In another embodiment of the invention, the composition comprises about 40-60 vol % of the ionic liquid and about 40-60 vol % of the physical absorption solvent.

The invention also comprises the method of purifying gaseous mixtures by use of these compositions. This method comprises contacting a gas mixture with a mixture of an ionic liquid and a physical absorption solvent in an absorbent zone wherein the ionic liquid and physical absorption solvent mixture absorbs at least one component from said gas mixture, and then the ionic liquid and physical absorption solvent mixture is regenerated to remove the absorbed component or components. The method is useful for carbon dioxide containing gas mixtures. Among the gas mixtures that may be treated are natural gas, flue gas, syngas, and shale gas.

In the method, the physical absorption solvents that may be used include, but are not limited to, dimethyl ethers of propylene glycol, N-methyl-2-pyrrolidone, methanol, propylene carbonate, poly(propylene glycol) di-methyl ether (PPGDME), poly(propylene glycol) di-acetate (PPGDAc), poly(butylene glycol) di-acetate (PBGDAc) with linear or branched C4 monomers, poly(dimethyl siloxane) (PDMS), perfluoropolyether (PFPE), glycerol tri-acetate (GTA), acetone, methyl acetate, 1,4-dioxane, 2-methoxyethyl acetate, 2-nitropropane, n,n-dimethylacetamide, acetylacetone, 1-nitropropane, isooctane, 2-(2-butoxyethoxy)ethyl acetate, n-formylmorpholine, 2-butoxyethyl acetate, and n-tert-butylformamide. Preferably, the physical absorption solvent is dimethyl ether of propylene glycol, N-methyl-2-pyrrolidone, methanol and propylene carbonate. The cation of the ionic liquids may be selected from, but is not limited to, the following: ammonium, phosphonium, imidazolium, pyrazolium, pyridinium, pyrrolidinium, sulfonium, piperidinium, caprolactamium, guanidinium and morpholium. The anion of the ionic liquid may be selected from, but is not limited to, the following: halides, carboxylates, sulfonates, sulfates, tosylates, carbonates, phosphates, phosphinates, borates, cyanates, bis(trifluoromethylsulfonyl)imides, and aprotic heterocyclic anions. The preferred ionic liquids may be selected from the group consisting of phosphonium and imidazolium acetate ionic liquids. The composition may further comprise water. The mixture of physical absorption solvent and ionic liquid may comprise from about 5-95 vol % ionic liquid and from about 5-95 vol % physical absorption solvent. In another embodiment, the mixture comprises from about 25-75 vol % of the ionic liquid and from about 25-75 vol % of the physical absorption solvent. The mixture may comprise from about 40-60 vol % of said ionic liquid and from about 40-60 vol % of said physical absorption solvent. The method is particularly useful for gas mixtures containing carbon dioxide. Among the gas mixtures that may be treated are natural gas, flue gas, syngas, and shale gas.

The addition of an ionic liquid to a physical absorption solvent has the capability to eliminate the need for refrigeration and effluent washing. The addition of ionic liquids to physical absorption solvents at a range of concentrations demonstrates an increase in performance compared to the physical absorption solvents. Among the benefits of ionic liquid addition to physical absorption solvent are an increased performance in capacity and a lower possible operating pressure.

In the present invention, a phosphonium or imidazolium based ionic liquid is added to a physical absorption solvent. In an autoclave, the ionic liquid and physical absorption solvent mixture was exposed to a carbon dioxide and methane gas mixture, 2068 kPa (300 psi) of 10 mol % $CO_2/CH_4$. The mixture is stirred for 1 hour at room temperature, and then a sample from the gas headspace is taken and analyzed.

The DEPG and NMP ionic liquid mixtures performed better than methanol ionic liquid mixtures at each solvent wt % for the imidazolium ionic liquids. Methanol and ionic liquid mixtures performed better than NMP or DEPG ionic liquid mixtures at each solvent wt % for the phosphonium ionic liquids. Adding a small amount of ionic liquid unexpectedly increased the performance of the absorption solvent. These results lead to a conclusion that combination of physical absorption technology with ionic liquids increased the performance of the solvent used in the physical absorption.

Laboratory Procedure

The ionic liquid and physical absorption solvent were combined and stirred until well mixed in a glass insert with a magnetic stir bar. The glass insert is then placed in a 75 mL Parr reactor. The reactor is flushed with nitrogen and pressurized with a carbon dioxide/methane gas mixture. After stirring for 1 hour, a gas sample of the headspace is removed for GC analysis.

Example with $CO_2/CH_4$

Tris(propyl/butyl)methylphosphonium acetate (2.20 g, 0.0087 mol) was added to DEPG (2.13 g, 0.0085 mol) in a glass insert for a 75 mL autoclave and stirred until well mixed with a magnetic stir bar. The 75 mL autoclave was loaded with the glass insert containing the ionic liquid mixture. The autoclave was flushed with nitrogen and then pressurized with 2068 kPa (300 psi) of a 10 mol % carbon dioxide/methane gas mixture. The mixture was stirred for an hour with a magnetic stir bar at 500 rpm. A sample of the headspace was obtained and submitted for GC analysis. Results indicated 22% of the carbon dioxide had been removed.

Example of Isotherm Experiment

Tris(propyl/butyl)methylphosphonium acetate (2.92 g, 0.0100 mol) was added to DEPG (0.55 g, 0.0173 mol) in a glass insert for a 75 mL autoclave and stirred until well mixed with a magnetic stir bar. The 75 mL autoclave was loaded with the glass insert containing the ionic liquid mixture. The autoclave was flushed with nitrogen and then pressurized with the desired amount of carbon dioxide. The mixture was stirred 500 rpm until an equilibrium pressure was obtained. The observed decrease in pressure was attributed to the absorption of carbon dioxide.

Results

TABLE 1

Capacity of a Phosphonium Based Ionic Liquid and Physical Absorption Solvents

| Absorption Solvent | capacity (mol $CO_2$ removed/mol IL) |
| --- | --- |
| NMP | 0.022 |
| DEPG | 0.025 |
| MeOH | 0.007 |
| PmixOAc + NMP (14 wt %) | 0.094 |

TABLE 1-continued

Capacity of a Phosphonium Based Ionic Liquid and Physical Absorption Solvents

| Absorption Solvent | capacity (mol $CO_2$ removed/mol IL) |
| --- | --- |
| PmixOAc + MeOH (14 wt %) | 0.280 |
| PmixOAc + DEPG (13 wt %) | 0.142 |

*2068 kPa (300 psi) of (10 mol %) $CO_2/CH_4$ added
NMP = N-methylpyrrolidone
DEPG = dimethylether of polyethylene glycol
MeOH = methanol

TABLE 2

Capacity of an Imidazolium Based Ionic Liquid and Physical Absorption Solvents

| Absorption Solvent | capacity (mol $CO_2$ removed/mol IL) |
| --- | --- |
| NMP | 0.022 |
| DEPG | 0.025 |
| MeOH | 0.007 |
| bmimOAc + NMP (16 wt %) | 0.289 |
| bmimOAc + MeOH (12 wt %) | 0.235 |
| bmimOAc + DEPG(17 wt %) | 0.289 |

*2068 kPa (300 psi) of (10 mol %) $CO_2/CH_4$ added
NMP = N-methylpyrrolidone
DEPG = dimethylether of polyethylene glycol
MeOH = methanol In particular, it was found that ionic liquids increased the capacity of physical absorption solvents at low pressures of carbon dioxide. The type of solvent plays a role in the performance of the ionic liquid.

The invention claimed is:

1. A composition comprising an ionic liquid and a physical absorption solvent wherein said ionic liquid comprises a cation selected from the group consisting of ammonium, phosphonium, pyrazolium, pyrrolidinium, sulfonium, piperidinium, caprolactamium, guanidinium, and morpholium and an acetate anion wherein the physical absorption solvent is a dimethyl ether of polyethylene glycol.

2. The composition of claim 1 wherein said cation is a tetraalkyl phosphonium.

3. The composition of claim 1 further comprising water.

4. The composition of claim 1 wherein said composition comprises from about 1-45 vol % physical absorption solvent.

5. The composition of claim 1 wherein said composition comprises from about 10-35 vol % physical absorption solvent.

6. The composition of claim 1 wherein said composition comprises from about 10-30 vol % of said physical absorption solvent.

7. The composition of claim 1 wherein said composition comprises from about 10-20 vol % of said physical absorption solvent.

* * * * *